United States Patent [19]

Matsumoto et al.

[11] Patent Number: 4,635,137
[45] Date of Patent: Jan. 6, 1987

[54] PHASE CONTROL SYSTEM FOR A VIDEO TAPE RECORDER

[75] Inventors: Tokikazu Matsumoto, Osaka; Kouichi Igata, Hirakata, both of Japan

[73] Assignee: Matsushita Electric Industrial Co., Ltd., Kadoma, Japan

[21] Appl. No.: 538,926

[22] Filed: Oct. 4, 1983

[30] Foreign Application Priority Data

Oct. 6, 1982 [JP] Japan .................. 57-175719

[51] Int. Cl.[4] .................. H04N 5/78
[52] U.S. Cl. .................. 360/10.2; 360/10.3
[58] Field of Search .................. 360/10.2, 10.3, 70, 360/73

[56] References Cited

U.S. PATENT DOCUMENTS 3,663,764  5/1972  Trost et al. .................. 360/70
4,127,881 11/1978  Wakami et al. .................. 360/77 X
4,456,932  6/1984  Honjo et al. .................. 360/10.3 X
4,463,390  7/1984  Koga et al. .................. 360/10.3
4,484,235 11/1984  Yokobori et al. .................. 360/10.3 X

OTHER PUBLICATIONS

"Microprocessor Controlled Variable Play-Back Speed System for Video Tape Recorder", IEEE Transactions on Consumer Electronics; vol. CE-26, No. 1, Feb. 1980, pp. 121-128.

Primary Examiner—Aristotelis M. Psitos
Attorney, Agent, or Firm—Wenderoth, Lind & Ponack

[57] ABSTRACT

In a tape recorder, when a magnetic tape changes its transportation speed for special reproduction, either one of a phase reference signal and a magnetic tape transportation phase signal representing the transportation phase of the magnetic tape is delayed by a delay circuit so that the signal not passing therethrough is compared with that having passed through the delay circuit, at which time the delay time of delay circuit is changed corresponding to the transportion speed of the magnetic tape so as to carry out phase control, thereby obtaining the optimum tracking in the reverse normal, double, and triple speed reproduction modes.

5 Claims, 32 Drawing Figures

PHASE CONTROL SYSTEM FOR A VIDEO TAPE RECORDER

BACKGROUND OF THE INVENTION

1. Field of the Invention

This invention relates to a phase control system for a video tape recorder using a helical scanning system which is capable of carrying out variable speed reproduction.

2. Description of Prior Art

In the video tape recorder, a demand has been raised for a function to reproduce signals recorded on the magnetic tape at speeds different from the normal speed (to be hereinafter called a special reproduction).

In the case of such special reproduction, however, since the path of the rotary video head travelling on the magnetic tape is different from the recorded path, one recorded path cannot accurately be scanned so as to generate a time period during which the reproduced output signal is reduced.

In such particular reproduction speed modes as the reversed normal speed motion mode, the still mode, the double speed fast motion mode, and the triple speed fast motion mode, the time period during which the reproduction output signal is reduced can be positioned in the vicinity of the vertical synchronizing signal, thereby enabling a television receiver to obtain a proper reproducing picture substantially free from the generation of noise bars.

It is necessary for performing the special reproduction to transport the magnetic tape accurately under phase control so that the path of the rotary video head is controlled so as to position the time period during which the reproduction output signal is reduced in the vicinity of the vertical synchronizing signal. Also, in the normal reproduction mode, the magnetic tape has to be transported under accurate phase control so that the rotary video head travelling on the magnetic tape accurately scans the recorded path. For an accurate phase control, a method has hitherto been used which records a control signal at every frame, during the recording, on a control track provided at the magnetic tape lengthwise thereof and reproduces the recorded control signal during the reproduction, so that the tape is subjected to phase control by the use of the reproduced control signal. In this case, unless a distance (to be hereinafter called a value X) between the positions of recorded video track and control signal on the magnetic tape, when recorded by a video tape recorder of the same standard, is determined to be a constant value, it is impossible for the phase control on the tape transport to allow the rotary video head to accurately scan the recorded video track during the reproduction.

However, in fact, an error is caused by the mechanical accuracy on the mounting position of the control head for recording the control signal, so that variations in the value X are produced even in the video tape recorder of the same standard. Hence, in some cases, the rotary video head cannot scan the recorded video track accurately.

Conventionally, an adjustment of the reference phase for phase comparison with the phase control system has corrected the variations in the value X, which has been useful only for the normal reproduction mode. Since the correction values are different in the special reproduction modes, even when the variations in value X are corrected for the normal reproduction mode, there has been a defect in such that the value X should be corrected independently for each special reproduction mode.

SUMMARY OF THE INVENTION

An object of the invention is to provide a phase control system for a video tape recorder, which carries out automatic correction of the value X during the special reproduction modes including the reverse normal speed, and double and triple speed fast motion modes, thereby enabling an optimum tracking.

Another object of the invention is to provide a phase control system for a video tape recorder, which divides a delay circuit which delays a tape transportation phase signal corresponding to a tape transportation phase or a reference phase signal into two delay circuits so that the delay time of each divided delay circuit is separately controlled, thereby carrying out by a simple construction the X-value correction during the reproduction at the double and triple fast motion speeds.

The above objects will be attained by providing a delay circuit which delays either one of the reference phase signal and the magnetic tape transportation phase signal corresponding to the transportation phase of the magnetic tape when a speed indication unit indicates a change in the transportation speed of the magnetic tape during reproduction; a delay time control circuit for controlling the delay time of the delay circuit, and a phase control circuit which phase-compares the output signal of the delay circuit with the signal which is not delayed by the delay circuit from among the aforesaid reference phase signal and magnetic tape transportation phase signal, so that the delay time of the delay circuit is controlled to obtain the optimum tracking corresponding to the change of transportation speed according to the indication of the speed indication unit on the basis of the delay time of the delay circuit when the optimum tracking of reproducing head is obtained at a certain transportation speed.

The above and further objects and novel features of the invention will more fully appear from the following detailed description in accordance with the accompanying drawings.

BRIEF DESCRIPTION OF THE DRAWINGS

FIGS. 2(a)-(i), 3(a)-(i) and 4(a)-(i) are views for explaining the path of the rotary video heads, and waveforms of a recorded control signal, a head switching pulse, a reproduced control signal, a trapezoidal wave, and a reproduced envelope signal;

DESCRIPTION OF THE PREFERRED EMBODIMENTS

Next, this invention will be described in accordance with embodiments thereof shown in the drawings.

FIG. 1(a) is an illustration of the positional relationship between a magnetic tape 2 wound onto a rotary cylinder 1 and a control head 3. In FIG. 1(a), rotary video heads $H_1$ and $H_2$ are mounted on a rotary cylinder 1 and rotate together therewith in the direction of the arrow 4. The magnetic tape 2 is guided by guide posts 6 and 7, wound onto the cylinder 1 at an angle of 180° or more, and transported in the direction of the arrow 5 by a capstan 8 and a pinch roller 7'.

The control head 3 records a control signal of 1 pulse on the magnetic tape 2 each time the rotary cylinder 1 rotates through an angle of 360°. FIG. 1(b) is a recorded track pattern in a part of the magnetic tape 2, in which reference numerals 10 to 16 designate the recorded video tracks and 17 designates a control track, the vertical lines therein representing the control signals recorded respectively. In FIG. 1(a), a distance on the magnetic tape 2 between the control head 3 and the rotary video head $H_2$ is represented by the value X, which varies according to the particular video tape recorder.

Next, an explanation will be given on a condition of obtaining the optimum tracking during the reproduction in the two double speed fast motion mode.

Figure 2:
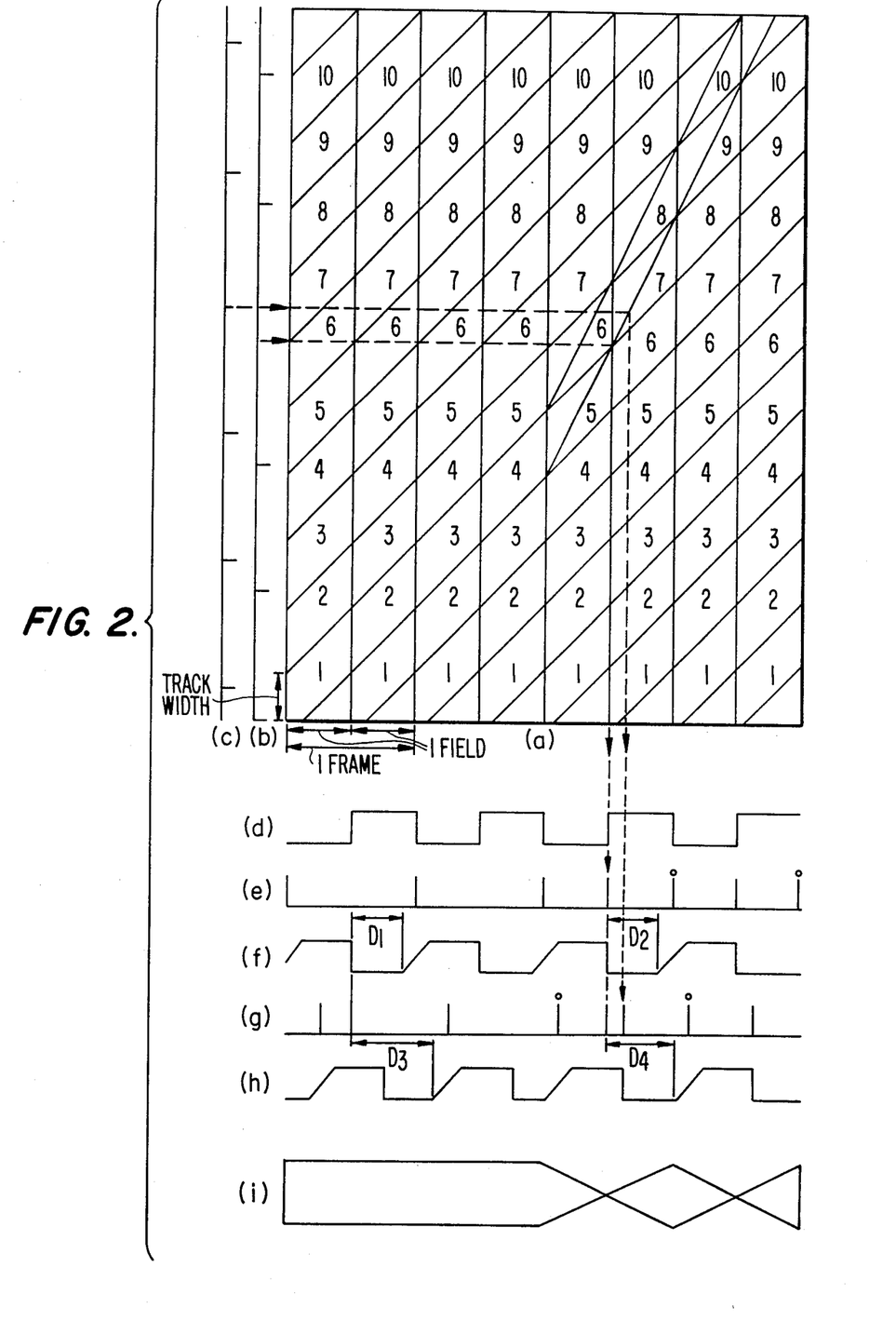

FIG. 2(a) shows the state where recorded track patterns of an azimuth recording type two head helical scan video tape recorder are repeatedly disposed, one scale at the abscissa axis representing a time period for one field and also the timing of a head changing-over switch. The thick lines show the head paths and transition from the normal speed to the double speed after the fourth field. The ordinate axis knows a tape transportation distance, one scale of which represents a tape transportation distance in one field time period, in other words, a width of recorded video track, during the recording or the normal reporduction. FIGS. 2(b) and (c) show the positions of recorded control signals. Since the control signal is recorded on the control track each time the rotary cylinder rotates 360°, one control pulse is recorded in a period corresponding to two video tracks on the magnetic tape. The positional relationship between the recorded control signal and the video track is different corresponding to the mounting position of the control head 3. FIGS. 2(b) and (c) are views exemplary of two control signals recorded in the different positions. FIG. 2(d) shows a head switching pulse waveform representing the rotary phase of rotary cylinder 1, which repeats the cycle of an H level in one field and an L level in the next field. FIGS. 2(e) and (g) show reproduced control signal waveforms, FIG. 2(e) showing the waveform of the reproduced control signal of FIG. 2(b), and FIG. 2(g) showing that of the reproduced control signal of FIG. 2(c). Since two control signals are reproduced in one frame at the double speed, a frequency divider circuit divides the frequency in two to put one signal in one field; the control signals each marked with a small circle (o) are selected by the frequency divider circuit.

Figure 1:
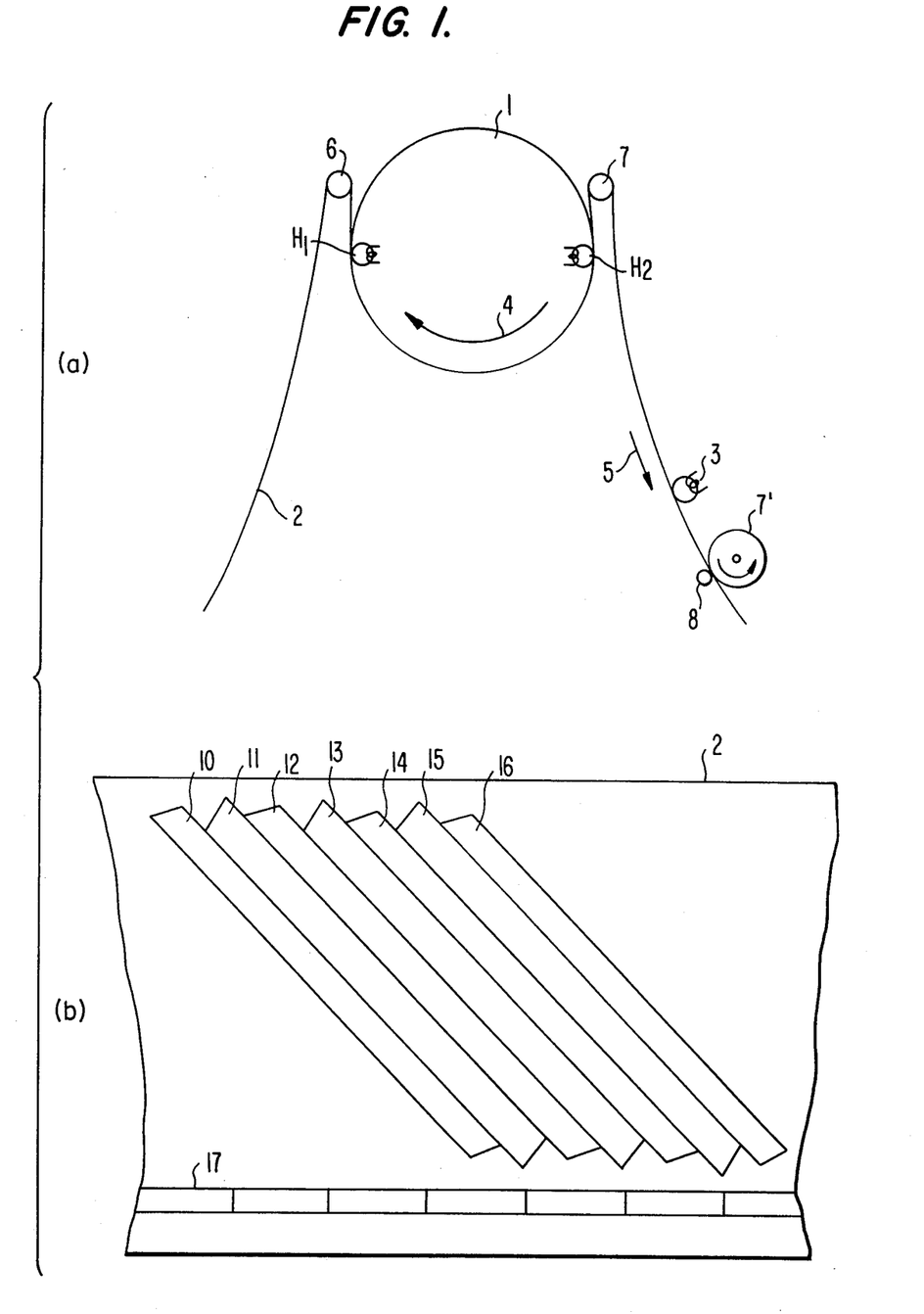
FIG. 1(a) is a view of layout of rotary video heads and a control head.
FIG. 1(b) is a view exemplary of a track pattern azimuth-recorded on a magnetic tape.

The control head 3, as shown in FIG. 1, is positioned apart from the rotary cylinder 1, thereby reproducing the recorded control signal in advance of the video track being reproduced. However, since the control signal is recorded on the control track at each regular interval, or one per two video tracks, it may be deemed that the control signal in the vicinity of a video track is reproduced. In other words, the control head during the reproduction may be regarded as positioned near the video track to be reproduced. In consideration of the above, the waveforms illustrated in FIG. 2(e) and FIG. 2(g) of the reproduced control signal can be obtained by the following construction.

Since FIG. 2(a) shows the recorded track patterns in a repeated arrangement, the path of the control head 3 is represented as the projection of the rotary head path on the ordinate axis, the head path being shown by the thick lines in FIG. 2(a). For example, FIG. 2(a) shows the control head when positioned to be represented as the projection of the lower edge of rotary head path on the ordinate axis. Accordingly, the waveforms illustrated in FIG. 2(e) and FIG. 2(g) of the reproduced control signal can be plotted in such a manner that the straight lines are drawn from the recorded control signal positions of FIG. 2(b) and FIG. 2(c) horizontally to the rotary head path and then the normals are drawn downwardly from the intersection of the straight lines with the lower edge of rotary head path so that the waveforms are written at the roots of the normals respectively. An example of this process is shown by broken lines with arrows in the drawing figure.

Since the video signals in FIGS. 2(a)–(i) are azimuth-recorded, when the head switching pulse of FIG. 2(d) is at an H level, the even numbered tracks are reproduced, and when it is at an L level, the odd numbered tracks are reproduced. Hence, the reproduced output signal waveform, when the rotary head travels on the path shown by the thick line in FIG. 2(a), is shown in FIG. 2(i). The path shown in FIG. 2(a) changes after the fourth field in the double speed reproduction speed, thereby creating a lowering portion in the reproduced output signal waveform as shown in FIG. 2(i). The lowering portion, however, corresponds to the field switching point, that is, a portion of vertical synchronizing signal, so that no noise bar appears on the reproduced picture. In brief, in order to avoid appearance of a noise bar on the reproduced picture in the double speed mode for reproduction, the tape transportation should be phase-controlled to allow the rotary video head to scan the path as shown in FIG. 2(a). In other words, the condition of obtaining the optimum tracking is to allow the tape with the recorded control signals as shown in FIGS. 2(b) and (c) to be transported so as to reproduce the control signals as shown in FIGS. 2(e) and (g).

Figure 3:
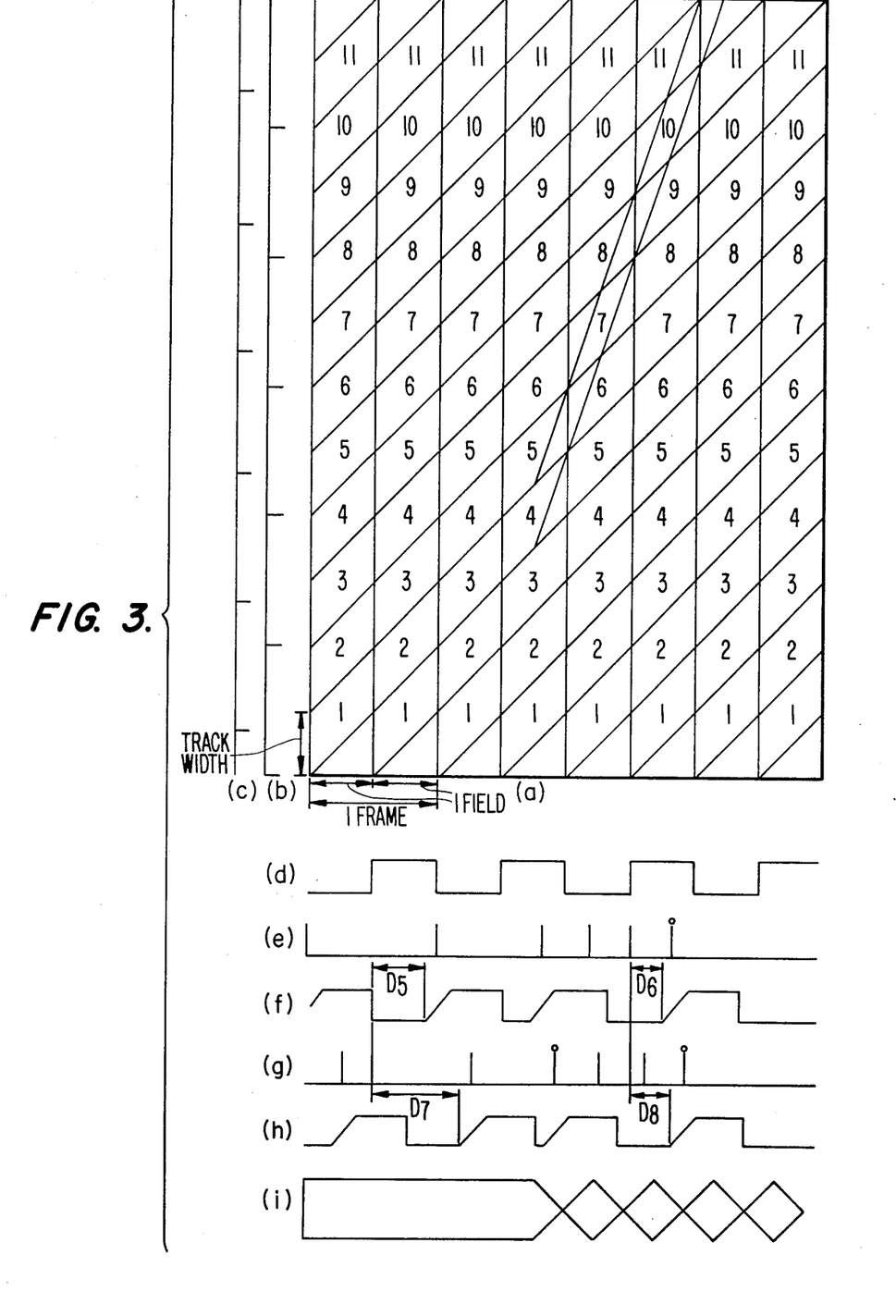
Figure 4:
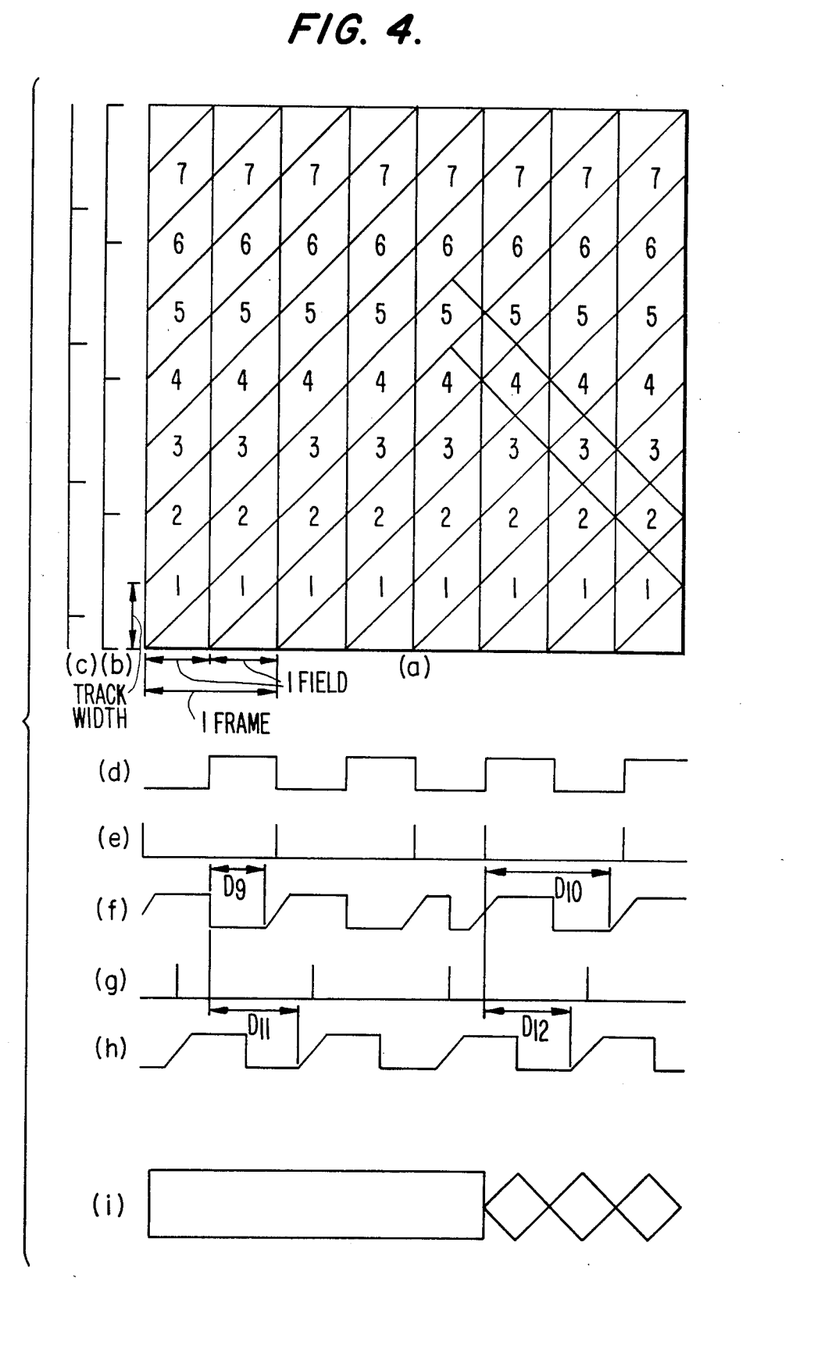

The optimum tracking conditions for the triple speed mode and the reverse normal speed motion mode are deemed similar to the above, which will be described with reference to FIGS. 3(a)–(i) and 4(a)–(i), in which the track patterns are shown when the tape transportation is switched from the normal speed to the triple speed and from the normal speed to the reverse normal speed, respectively.

In FIGS. 3(a)–(i), the reproduction speed is switched at the 4.5th field from the normal speed to the triple speed. FIGS. 3(e) and (g) represent the reproduced control signals for the recorded control signals shown in FIGS. 3(b) and (c), so that such control signal reproduction is the condition of the optimum tracking at the triple speed.

In FIGS. 4(a)–(i), the reproduction speed is switched at the 4.5th field from the normal speed to the reverse normal speed. In this case, it is the proper condition for the optimum tracking in the reverse normal speed mode to obtain the reproduced control signal shown in FIGS. 4(e) and (g).

Next, an explanation will be given on the tape transportation control system used to satisfy the above described optimum tracking condition during the reproduction in the reverse normal speed mode, the double speed mode, and the triple speed mode, with reference to FIG. 5.

Figure 5:
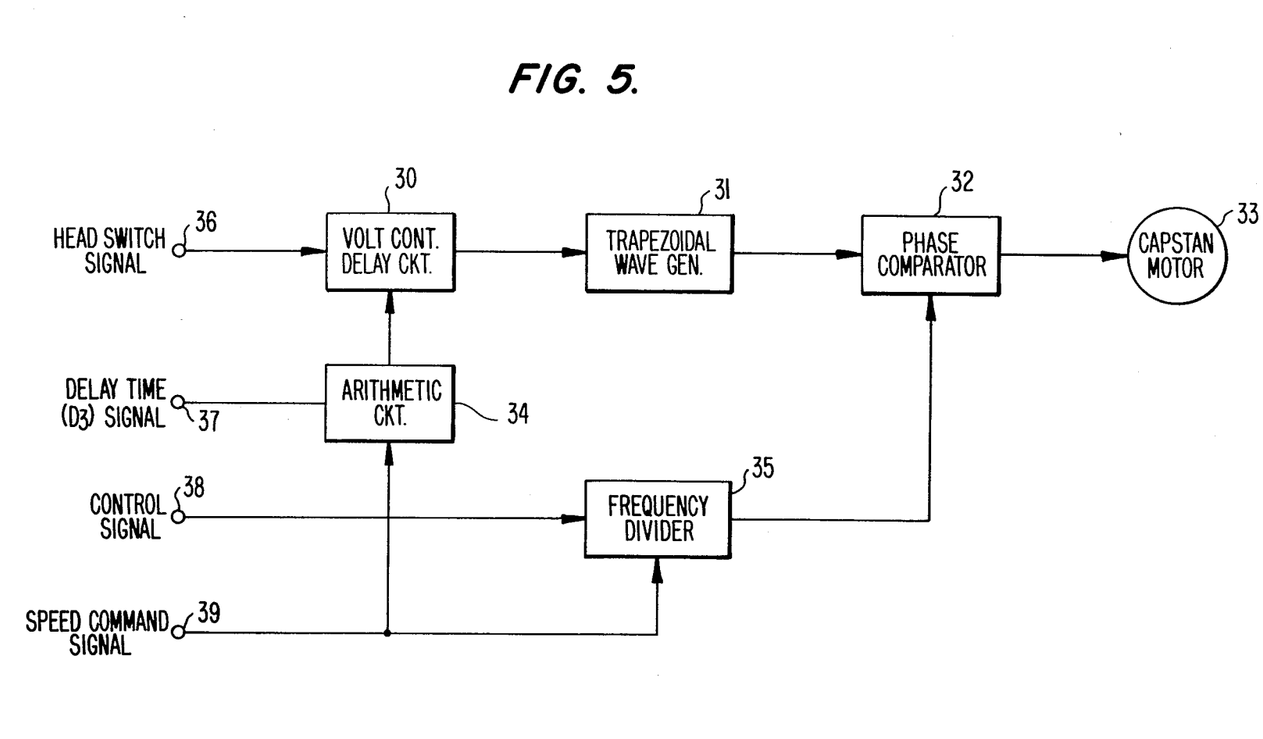
FIG. 5 is a block diagram of an embodiment of a phase control system for a video tape recorder in accordance with the present invention.

FIG. 5 is a block diagram of an embodiment of a phase control system for a video tape recorder in accordance with the present invention, in which the head switching pulse which is applied to an input terminal 36 and fed to a voltage-controlled type delay circuit 30 is delayed only for the predetermined time by an arithmetic circuit 34, and then fed to a trapezoidal wave generating circuit 31, which generates, for example, a trapezoidal wave starting to incline from the leading edge of the delayed head switching pulse, this waveform being shown in FIGS. 2(f) and (h) through FIGS. 4(f) and (h). The arithmetic circuit 34 can be configured by a known circuit or by a microcomputer. The trapezoidal wave is phase-compared by a phase comparator 32 with the reproduced control signal which is applied to an input terminal 38 and divided by a frequency divider 35 so that the output of the phase comparator 32 is fed to a capstan motor 33, thereby carrying out phase control for the tape transportation. The frequency divider 35 is fed a speed command signal which is applied to an input terminal 39 and carries out ½ division of the reproduced control signal at the double speed mode and a ⅓ division of the reproduced control signal at the triple speed mode, and directly outputs the input at the normal and one time reviewing mode speeds. The speed command signal is reproduced by a known speed selection circuit (not shown) coupled to an external speed select switch (not shown). The reproduction mode, i.e. the tape transportation speed, is changed by the speed command signal. In this way, phase control is applied to the tape transportation to make constant the phase relationship between the trapezoidal wave and the reproduction control signal, where the phase control is assumed to be applied, for example, so as to cause the position of the center of the slope of the trapezoidal wave to coincide with the reproduced control signal.

In the double speed mode, when the recorded control signal is as shown in FIG. 2(b), the reproduced control signal waveform is as shown by FIG. 2(e). Accordingly, in order to allow the rotary video head to travel on the path shown in FIG. 2(a), the trapezoidal wave of the aforesaid copstan motor phase control system becomes the waveform shown in FIG. 2(i).

In this case, as seen from FIGS. 2(a)–(i) the reproduction after the fourth field changes from the normal speed to the double speed, but the time periods $D_1$ and $D_2$ from the leading edge of the head switching pulse shown by FIG. 2(d) to the initial point of the slope of trapezoidal wave of FIG. 2(f) are unchanged. In other words, the delay time of the voltage-controlled delay circuit 30 in FIG. 5 need not be changed in the normal and double fast speeds. On the contrary, in a case where the recorded control signal is as shown in FIG. 2(c). the reproduced control signal waveform becomes as shown in FIG. 2(g), the trapezoidal wave with respect to the control signal has the waveform as shown in FIG. 2(h). In this case, the time periods $D_3$ and $D_4$ from the leading edge of head switching pulse to the initial point of the slope at the trapezoidal wave FIG. 2(h) are different from each other in the normal and double speeds. Hence, the rotary video head cannot scan the optimum path unless the delay time of the voltage-controlled delay circuit 30 in FIG. 5 is made different in the normal and double speeds. The same can be said for the reverse normal and triple speeds.

FIGS. 3(f) and (h) show the optimum trapezoidal waves with respect to the waveforms of FIG. 3(e) and FIG. 3(g). In a fashion which is similar to the double speed case described in FIGS. 2(a)–(i), as to the time periods $D_5$, $D_6$, $D_7$ and $D_8$ from the leading edge of the head switching pulse of FIG. 3(d) to the initial point of the slope at the trapezoidal wave, it is found that $D_5$ and $D_6$, and $D_7$ and $D_8$ are different from each other in the normal and triple speeds. In this case, for both the recorded control signals shown in FIGS. 3(b) and (c), the delay time of the voltage-controlled delay circuit 30 in FIG. 5 is required to be different in the normal and triple speeds. The reverse normal speed reproduction mode in FIGS. 4(a)–(i) can be considered to operate in the same fashion as that described above. In this case, when the recording control signal is as shown in FIG. 4(c), $D_{11}$ and $D_{12}$ are equal to each other so that the delay time need only be equal in the normal and the reverse normal speeds, but when the recording control signal is as shown in FIG. 4(b), $D_9$ is not equal to $D_{10}$, so that the delay time must be of a different value according to the reproduction mode.

As noted above, the correction in the tape transportation phase control system wherein the recorded control signal shifts, that is, the correction of the value X, should be carried out with different values in the double, triple, and the reverse normal speed modes, with respect to the normal speed. Hence, this embodiment in FIG. 5 carries out the correction of the X value by the voltage-controlled delay circuit 30 which is controlled by the arithmetic unit 34.

Next, an explanation will be given on the computing method for the X value correction by the arithmetic unit 34.

In FIGS. 2(a)–(i), when the recorded control signal is as shown by FIG. 2(b), the phase of the trapezoidal wave of FIG. 2(f) is unchanged at the normal and double speeds. In this case, the timing for the reproduction mode switching is carried out at the field switching point, and when the path of transportation in the integer fast speed mode is considered, the lower edge of the path surely intersects with each vertical line and oblique line at the intersection thereof in FIG. 2(a). Hence, in consideration of the aforesaid construction method for the reproduced control signal, in a case of a recorded control signal as shown in FIG. 2(b) the timing for speed change (for the reproduction mode switching) is carried out at the field switching point and the tape is transported in the integer fast speed mode, whereby the reproduced control signal appears inevitably at the timing for the trailing edge of the head switching pulse. Accordingly, at this time, the trapezoidal wave needs only have such a phase that the middle point of the slope becomes the trailing edge of the head switching pulse. Hence, when the recorded control signal is as shown in FIG. 2(b), if the reproduction speed is in the integer fast speed mode, the delay time of the voltage-controlled delay circuit 30 need only be constant.

Now, the correction of the value X for the recorded control signal other than shown by FIG. 2(b) is considered on the basis of the delay time ($D_1$ in FIGS. 2(a)–(i). Firstly, an explanation will be given on the reproduction in the double speed mode. When the recorded control signal is as shown in FIG. 2(c), the trapezoidal wave with respect to the reproduced control signal of FIG. 2(g) is as shown in FIG. 2(h) so that the delay time of the voltage-controlled delay circuit 30 at the normal speed is $D_3$. Accordingly, a difference between the delay time of the delay circuit 30 and the reference delay time, is $D_3-D_1$. Also, the delay time for the reproduction at the double speed is $D_4$ so that a difference between the delay time and the reference delay time is $D_4-D_1$. From $D_1=D_2$, the difference is equal to $D_4-D_2$. In consideration of the aforesaid construction method and the slope of rotary video head path being twice as large as that during normal speed reproduction, it is understood that the relationship between $D_1$ through $D_4$ is given in the following equation:

$$D_4-D_2=\tfrac{1}{2}(D_3-D_1) \tag{1}$$

In other words, when the delay time $D_3$ of the delay circuit 30 at the normal speed is known, the delay time $D_4$ in the double speed, in consideration of $D_1=D_2$, is given by $$D_4=D_1+\tfrac{1}{2}(D_3-D_1) \tag{2}$$

Hence, when the delay time at the normal speed is known, the delay time for reproduction at the double speed is obtainable from the equation (2).

Next, an explanation will be given on how to obtain the delay time for reproduction at the triple speed shown in FIGS. 3(a)-(i), in which the reproduction control signals of FIGS. 3(e) and (h) marked by small circles (o) represent those selected by the frequency divider 35. In a fashion which is similar to the double speed mode, in consideration of the construction method and in view of the fact that the path of rotary video head at the triple speed becomes three times as large as the path at the normal speed, it is seen that between $D_7-D_5$ and $D_8-D_6$, the following equation should hold:

$$D_8-D_6=\tfrac{1}{3}(D_7-D_5) \tag{3}$$

When one field time is represented by F, it is seen that between $D_5$ and $D_6$, the following equation should hold:

$$D_5=D_6+F/3 \tag{4}$$

Hence, from the aforesaid equations (3) and (4), the following equation is obtained:

$$D_8=D_5+\tfrac{1}{3}(D_7-D_5)+F/3 \tag{5}$$

Hence, the delay time at the triple speed is obtainable by use of Equation (5).

In the reverse normal speed motion mode, as shown in FIGS. 4(a)-(i) the following equation should hold:

$$D_{12}-D_{10}=-(D_{11}-D_9) \tag{6}$$

$$D_9=D_{10}-F \tag{7}$$

From equations (6) and (7), the equation:

$$D_{12}=D_9-(D_{11}-D_9)+F \tag{8}$$

is obtained to thereby enable computation of the delay time. From $D_1=D_5=D_9$ and $D_3=D_7=D_{11}$ as shown in FIGS. 2(a)-(i), 3(a)-(i) and 4(a)-(i), these equalities are substituted into the equations (5) and (8), and thus the following equation:

$$D_8=D_1+\tfrac{1}{3}(D_3-D_1)+F/3 \tag{9}$$

$$D_{12}=D_1-(D_3-D_1)+F \tag{10}$$

are obtained.

As seen from the above, when the delay time $D_3$ of the voltage-controlled delay circuit 30 during the normal reproduction is known, the delay times for the double, triple, and reverse normal reproduction speed can be obtained from the equations (2), (9) and (10), respectively.

Thus, the arithmetic circuit 34 controls the voltage-controlled type circuit 30 so as to phase-control the capstan motor 33, whereby the optimum tracking in the double, triple, and the reverse normal speed modes can be realized.

In addition, the reference delay time $D_1$ is the constant depending on the apparatus, which has been set in the arithmetic circuit, the delay time $D_3$ of the voltage-controlled type delay circuit 30 during the normal reproduction being given from the input terminal 37 so that the optimum tracking is obtainable. The delay time $D_3$ is applied to the input terminal 37 as a voltage signal which is produced by a known circuit (not shown) coupled to an external switch (not shown).

Figure 6:
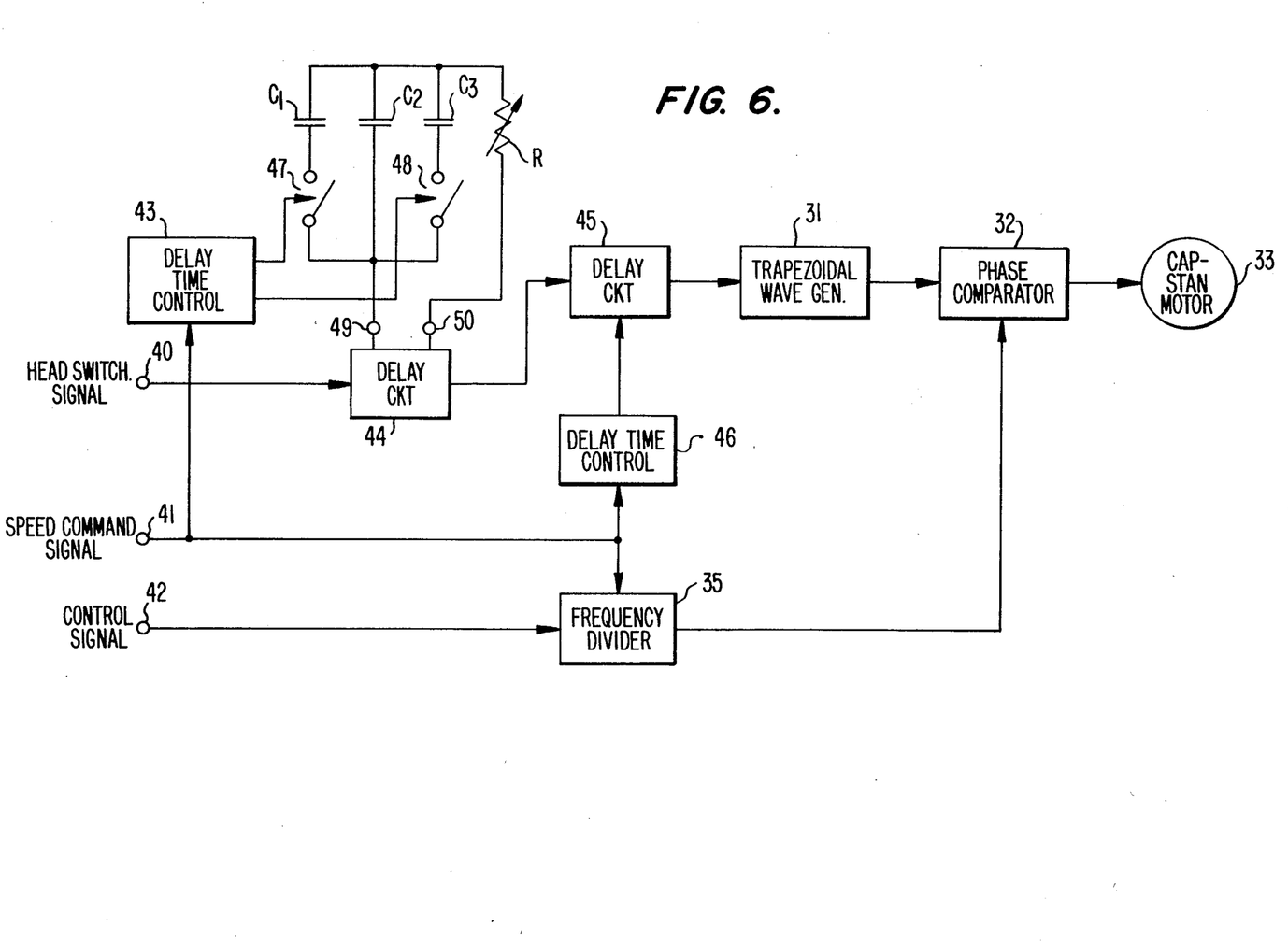
FIG. 6 is a block diagram of a modified embodiment of a phase control system for a video tape recorder in accordance with the present invention.

Alternatively, a modified embodiment of the invention will be described with reference to FIG. 6, which is simple in construction and obtainable of the optimum tracking in the double and triple reproduction speed motion modes.

The head switching pulse is fed from an input terminal 40, delayed in delay circuits 44 and 45, and fed to a trapezoidal wave generating circuit 31, the trapezoidal wave generated therefrom being compared by a phase comparator 32 with a reproduction control signal fed from an input terminal 42 and divided by a frequency divider 35, thereby phase-controlling a capstan motor 33, at which time the frequency divider 35 changes its dividing ratio by a speed command signal fed from an input terminal 41. Furthermore, in this case, the sum of the delay times of the delay circuits 44 and 45 should, as noted above, be changed to satisfy the equations (2) and (9) during the double and triple speed reproduction modes respectively. When the delay times of the delay circuits 44 and 45 for obtaining the optimum tracking at the normal reproducing speed are represented by $L_1$ and $L_2$ respectively, $L_1+L_2$ should satisfy the equations (2) and (9). Hence, $D_3=L_1+L_2$ is substituted into the same equations to obtain the following equations.

$$D_4=\tfrac{1}{2}L_1+(\tfrac{1}{2}L_2+\tfrac{1}{2}D_3) \tag{11}$$

$$D_8=\tfrac{1}{3}L_1+(\tfrac{1}{3}L_2+\tfrac{2}{3}D_3+F/3) \tag{12}$$

As seen from the equation (11), for reproduction at the double speed, the delay time of the delay circuit 44 need only be made equal to one half of normal speed and that of the delay circuit 45 be $(\tfrac{1}{2})L_2+(\tfrac{1}{2})D_1$. As seen from the equation (12), for reproduction in the triple speed mode, the delay time of the delay circuit 44 needs only be $\tfrac{1}{3}$ of normal speed and that of the delay circuit 45 be $(\tfrac{1}{3})L_2+(\tfrac{2}{3}D_1+F/3)$. The delay circuit 44 will obtain a delay time in proportion to the time constant of RC circuit connected to terminals 49 and 50, a variable resistance R being changed to change the delay time of the delay circuit 44, thereby obtaining the optimum-tracking at the normal speed. Capacitors $C_1$, $C_2$ and $C_3$ are so set that a ratio of capacity values thereof is 1/6:1/3:1/2, switches 47 and 48 both being closed by a delay time control means 43 during the normal speed. At the double speed, the delay time control means 43 closes the switch 47 and opens the switch 48 to halve the delay time of the delay circuit 44. At the triple speed, the means 43 opens the switches 47 and 48 to reduce the delay time of the delay circuit 44 to ⅓ of its previous value. The delay circuit 45 is preset to values of (½)$L_2$+(½)$D_1$ and (½)$L_2$+(⅔)$D_1$+F/3 and is switched by a delay time control means 46 to the values corresponding to reproductions in the double and triple speed modes, respectively. In addition, the delay time control means 43 and 46 are informed by the speed command signal fed from the input terminal 41 of the reproduction speed. Thus, the delay time satisfies the equations (2) and (9) to obtain the optimum tracking at the double and triple reproduction speeds.

Figure 7:
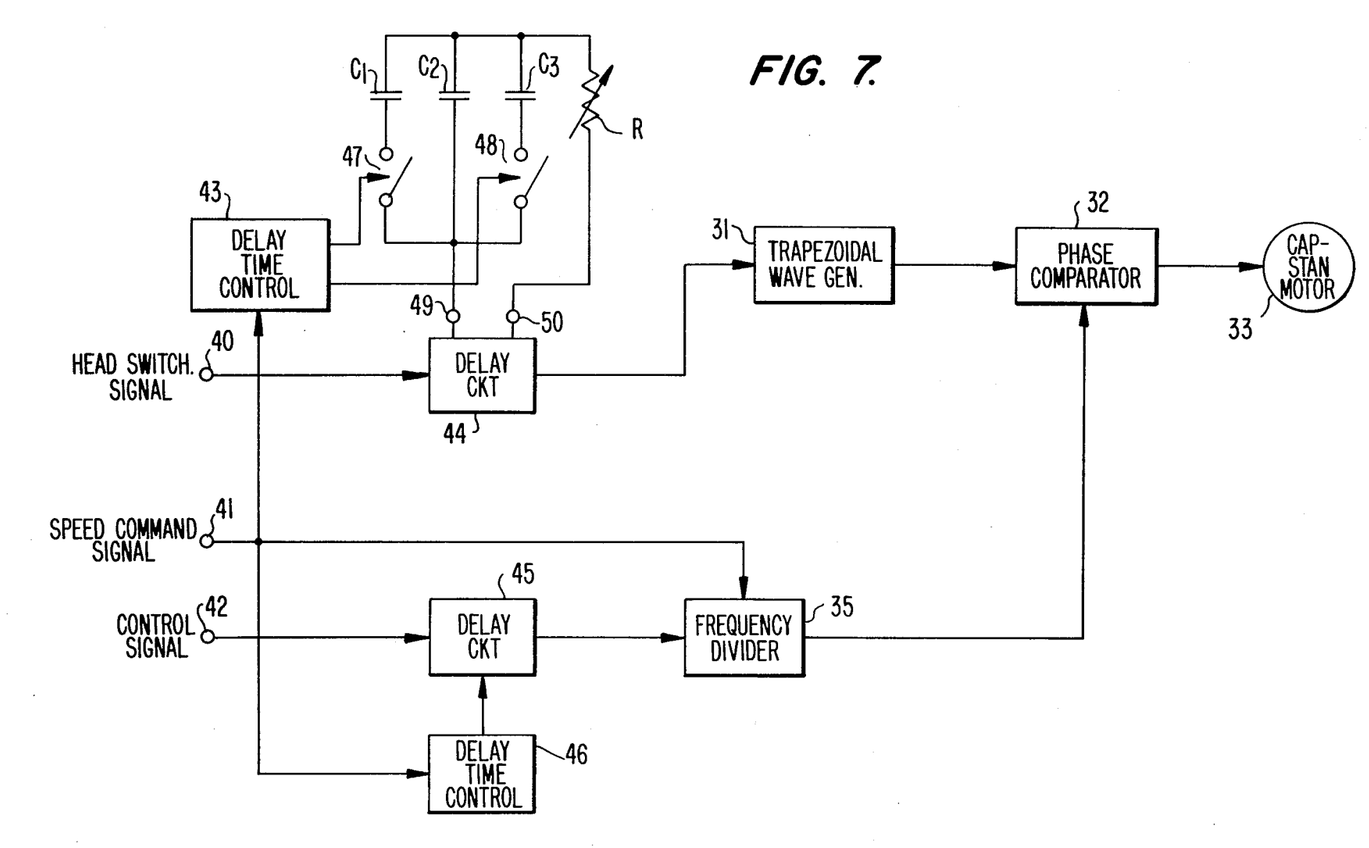
FIG. 7 is a block diagram of another modified embodiment of a phase control system for a video tape recorder in accordance with the present invention.

Alternatively, the delay circuit 45 may be connected between the input terminal 42 and the frequency divider 35. In this case, the delay time of the delay circuit 32 needs only be (½)$L_2-D_1$ at the double speed, and (½)$L_2-$(⅔)$D_1-F/3$ at the triple speed. This modified embodiment of the present invention is shown in FIG. 7, in which the same components are designated by the same reference numerals as those in the former embodiments.

Since many different embodiments of the invention may be made without departing from the spirit and scope of the invention, it is understood that the invention is not limited to the specific embodiments thereof except as defined in the appended claims.

What is claimed is:

1. A phase control system for a video tape recorder, comprising:
   a delay circuit for delaying one of a head switching signal representing a rotary phase of a rotary cylinder having video heads mounted thereon and a control signal reproduced from a magnetic tape and representing a transportation phase of said magnetic tape;
   a means for producing a speed command signal specifying a reproduction speed of said video tape recorder;
   a delay time control circuit responsive to said speed command signal for controlling said delay circuit; and
   a phase control circuit for comparing phases of an output of said delay circuit with the other of said head switching signal and said control signal which is not delayed by said delay circuit, and for controlling a rotary phase of a tape transporting capstan motor of said video tape recorder so as to thereby control the transportation phase of said magnetic tape to allow said video heads obtain an optimum tracking;
   wherein said delay time control circuit controls said delay circuit in such a manner that delay times $D_3$, $D_{12}$, $D_4$ and $D_8$ of said delay circuit at normal, reverse normal, double and triple reproduction speeds, respectively, substantially satisfy the following conditions:

$$D_{12}=-D_3+2D_1+F$$

$$D_4=(\tfrac{1}{2})D_3+(\tfrac{1}{2})D_1$$

$$D_8=(\tfrac{1}{3})D_3+(\tfrac{2}{3})D_1+F/3$$

where $D_1$ is a reference delay time and F is one field time period.

2. A phase control system for a video tape recorder, comprising:
   a first delay circuit for delaying one of a head switching signal representing a rotary phase of a rotary cylinder having video heads mounted thereon and a control signal reproduced from a magnetic tape and representing a transportation phase of said magnetic tape;
   a second delay circuit for delaying an output signal of said first delay circuit;
   a means for producing a speed command signal specifying a reproduction speed of said video tape recorder;
   a first delay time control circuit responsive to said speed command signal for controlling said first delay circuit;
   a second delay time control circuit responsive to said speed command signal for controlling said second delay circuit; and
   a phase control circuit for comparing phases of an output signal of said second delay circuit with the other of said head switching signal and said control signal which is not delayed by said first delay circuit and for controlling a rotary phase of a tape transporting capstan motor of said video tape recorder so as to thereby control the transportation phase of said magnetic tape to allow said video heads obtain an optimum tracking;
   wherein said first delay time control circuit controls said first delay circuit in such a manner that delay times of said first delay circuit at double and triple reproduction speeds are substantially (½)$L_1$ and (⅓)$L_3$, respectively, where $L_1$ is a delay time of said first delay circuit at a normal reproduction speed.

3. A phase control system according to claim 2, wherein said second delay time control circuit controls said second delay circuit in such a manner that delay times of said second delay circuit at double and triple reproduction speeds are substantially (½)$L_2$+(½)$D_1$ and (½)$L_2$+(⅔)$D_1$+$F_3$, respectively, where $L_2$ is a delay time of said second delay circuit at the normal reproduction speed, and $D_1$ is a reference delay time, and F is one field time period.

4. A phase control system for a video tape recorder, comprising:
   a delay circuit for delaying a head switching signal representing a rotary phase of a rotary cylinder having video heads mounted thereon;
   a means for producing a speed command signal specifying a reproduction speed of said video tape recorder;
   a means for reproducing a control signal from a magnetic tape representing a transportation phase of said magnetic tape;
   a delay time control circuit responsive to said speed command signal for controlling said delay circuit;
   a frequency divider responsive to said speed command signal for dividing a frequency of said control signal; and
   a phase control circuit for comparing phases of an output signal of said delay circuit with an output signal of said frequency divider, and for controlling a rotary phase of a tape transportation capstan motor of said video tape recorder so as to thereby control the transportation phase of said magnetic tape to allow said video heads obtain an optimum tracking;

wherein said delay time control circuit controls said delay circuit in such a manner that delay time $D_3$, $D_{12}$, $D_4$ and $D_8$ of said delay circuit at normal, reverse normal, double and triple reproduction speeds, respectively, substantially satisfy the following conditions:

$$D_{12} = -D_3 + 2D_1 + F$$

$$D_3 = (\tfrac{1}{2})D_3 + (\tfrac{1}{2})D_1$$

$$D_8 = (\tfrac{1}{3})D_3 + (\tfrac{2}{3})D_1 + F/3$$

where $D_1$ is a reference delay time and $F$ is one field time period.

5. A phase control system according to claim 4, wherein said delay circuit comprises first and second delay circuits, wherein said delay time control circuit controls said first delay circuit in such a manner that delay times of said first delay circuit at the double and triple reproduction speeds are substantially $(\tfrac{1}{2})L_1$ and $(\tfrac{1}{3})L_1$, respectively, where $L_1$ is a delay time of said first delay circuit at the normal reproduction speed, and wherein said delay time control circuit controls said second delay circuit in such a manner that delay times of said second delay circuit at the double and triple reproduction speeds are substantially $(\tfrac{1}{2})L_2 + (\tfrac{1}{2})D_1$ and $(\tfrac{1}{3})L_2 + (\tfrac{2}{3})D_1 + F/3$, respectively, where $L_2$ is a delay time of said second delay circuit at the normal reproduction speed.

* * * * *